(12) United States Patent
Agrawal et al.

(10) Patent No.: US 8,612,508 B1
(45) Date of Patent: Dec. 17, 2013

(54) HIGH SPEED ONE'S COMPLEMENT CHECKSUM GENERATOR/CHECKER

(75) Inventors: Anurag Agrawal, Santa Clara, CA (US); Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1222 days.

(21) Appl. No.: 12/245,908

(22) Filed: Oct. 6, 2008

(51) Int. Cl.
*G06F 11/10* (2006.01)
*G06F 7/50* (2006.01)

(52) U.S. Cl.
USPC ............................. 708/530; 708/708; 714/807

(58) Field of Classification Search
USPC ................... 708/530, 708, 709; 714/758, 807
See application file for complete search history.

(56) References Cited

U.S. PATENT DOCUMENTS

| | | | | |
|---|---|---|---|---|
| 4,538,238 | A * | 8/1985 | Circello et al. | 708/491 |
| 7,707,477 | B2 * | 4/2010 | Go et al. | 714/758 |
| 2005/0015423 | A1 * | 1/2005 | D'Arcy et al. | 708/530 |
| 2005/0097433 | A1 * | 5/2005 | D'Arcy et al. | 714/807 |

* cited by examiner

*Primary Examiner* — Chuong D Ngo
(74) *Attorney, Agent, or Firm* — Harrity & Harrity, LLP

(57) ABSTRACT

A device may include a compressor. The compressor may receive a first number of inputs, each of the inputs having a predetermined width. The compressor may also compute a one's complement sum of the first number of inputs to generate carry bits having the predetermined width and sum bits having the predetermined width, modify the carry bits by moving a most significant bit of the carry bits to a least significant bit position, and output the modified carry bits and the sum bits.

20 Claims, 12 Drawing Sheets

$$\begin{array}{r} \overset{904}{\overbrace{1\,0\,0\,0\,1}} \\ 1\,0\,0\,0\,1 \\ +\ 1\,0\,1\,1\,1 \\ \hline \underset{902}{\underbrace{0\,0\,1\,1\,0}} \end{array}$$

Fig. 9A

$$\begin{array}{r} \overset{904}{\overbrace{1\,0\,0\,0\,1\,0}} \\ +\ \ \ 0\,0\,1\,1\,0 \\ \hline \overset{906}{\overbrace{1}}\,0\,1\,0\,0\,0 \\ +\ \longrightarrow\ \textcircled{1} \\ \hline 0\,1\,0\,0\,1 \end{array}$$

Fig. 9B

$$\begin{array}{r} \overset{906}{\overbrace{1}}\overset{904}{\overbrace{0\,0\,0\,1\,0}} \\ +\ \longrightarrow\ \textcircled{1} \\ \hline \underset{908}{\underbrace{0\,0\,0\,1\,1}} \\ +\ \underset{902}{\underbrace{0\,0\,1\,1\,0}} \\ \hline \end{array}$$

Fig. 9C

HIGH SPEED ONE'S COMPLEMENT CHECKSUM GENERATOR/CHECKER

BACKGROUND

One system of representing a binary number is known as one's complement. In one's complement, a negative number is represented by a complement of its positive counterpart. For example, assume that number 23 in six bits is represented by "010111." In such a case, −23 is represented by "101000," which is obtained by inverting each bit of "010111."

SUMMARY

According to one aspect, a device may include a K-to-2 compressor. The K-to-2 compressor may receive a first number of inputs of a predetermined width, compute a one's complement sum of the first number of inputs to generate carry bits having the predetermined width and sum bits having the predetermined width, modify the carry bits by moving a most significant bit of the carry bits to a least significant bit position, and output the modified carry bits and the sum bits to a component.

According to one aspect, a device may include a compressor. The compressor may receive a first number of inputs, each of the inputs having a predetermined width. In addition, the compressor may compute a one's complement sum of the first number of inputs to generate carry bits having the predetermined width and sum bits having the predetermined width, modify the carry bits by moving a most significant bit of the carry bits to a least significant bit position, and output the modified carry bits and the sum bits.

According to another aspect, a method may include receiving inputs, each input having a predetermined width. Additionally, the method may also include computing a one's complement sum of the inputs to generate carry bits of the predetermined width and sum bits of the predetermined width, modifying the carry bits by removing a most significant bit of the carry bits, by shifting the carry bits to left by one bit, and by placing the most significant bit in an empty bit slot created by the shift, and outputting the modified carry bits and the sum bits According to yet another aspect, a device may include means for receiving data via three groups of input buses, means for determining a one's complement sum of the data input via the three groups of input buses to generate carry bits on carry buses and sum bits on sum buses, means for modifying the carry bits by converting a most significant bit of the carry bits into a least significant bit of the carry bits, and means for sending the modified carry bits on the carry buses and the sum bits on the sum buses.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIGS. 9A through 9C illustrate properties that are associated with one's complement addition;

DETAILED DESCRIPTION OF PREFERRED EMBODIMENTS

The following detailed description refers to the accompanying drawings. The same reference numbers in different drawings may identify the same or similar elements. The term "packet," as used herein, may include a packet, a datagram, and/or a cell; a fragment of a packet, a datagram, and/or a cell; and/or other types of data. As used herein, the term "microinstruction" may include a microcode instruction.

The term "memory device," as used herein, may refer to dynamic memory, such as registers, on-chip memory (e.g., on-board cache), random access memory (RAM), and static RAM (SRAM), for storing data and machine-readable instructions. Depending on context, "memory device" may also refer to static memory, such as read only memory (ROM), or storage devices, such as a floppy disk, Compact Disk (CD) ROM, CD read/write (R/W) disc, and/or flash memory, as well as other types of storage devices.

Figure 1:
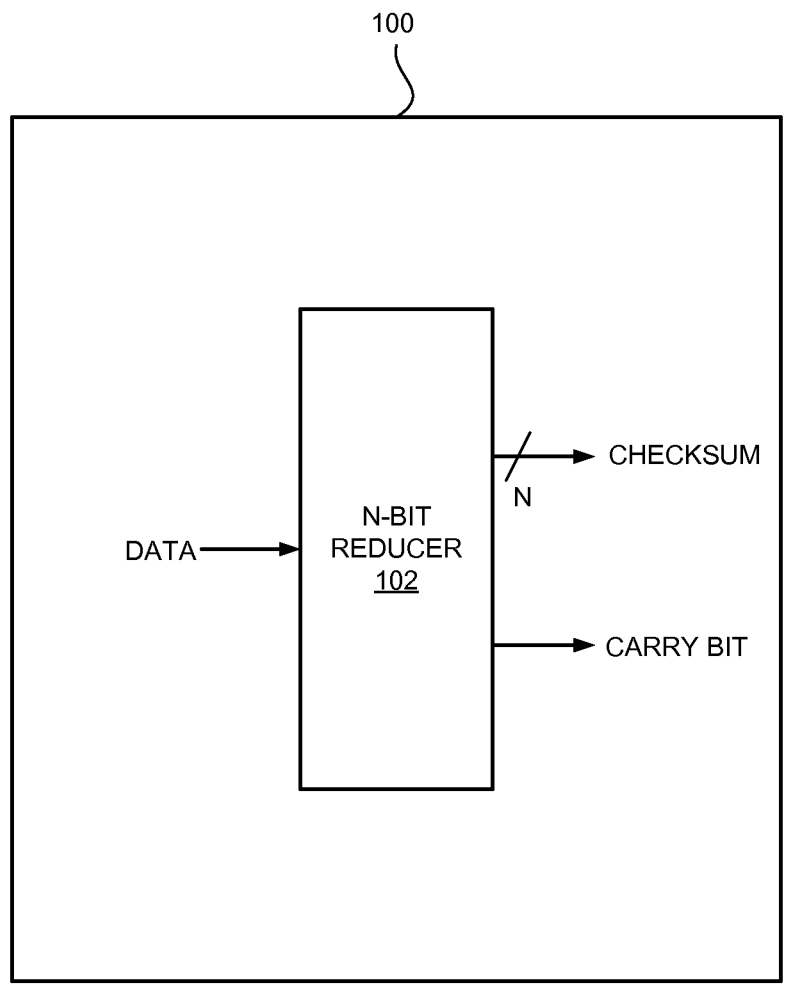
FIG. 1 is a block diagram illustrating a component that includes an exemplary one's complement generator.

As described below, a device may include a high speed one's complement generator. FIG. 1 is a block diagram that illustrates a component that includes one's complement generator. As shown, a device or a component 100 may include N-bit reducer 102. N-bit reducer 102 may accept data from buses of a given width M (e.g., 480 bits), perform a high speed computation of one's complement sum of width N (e.g., 16 bits), and output the sum and a carry bit.

Figure 2:
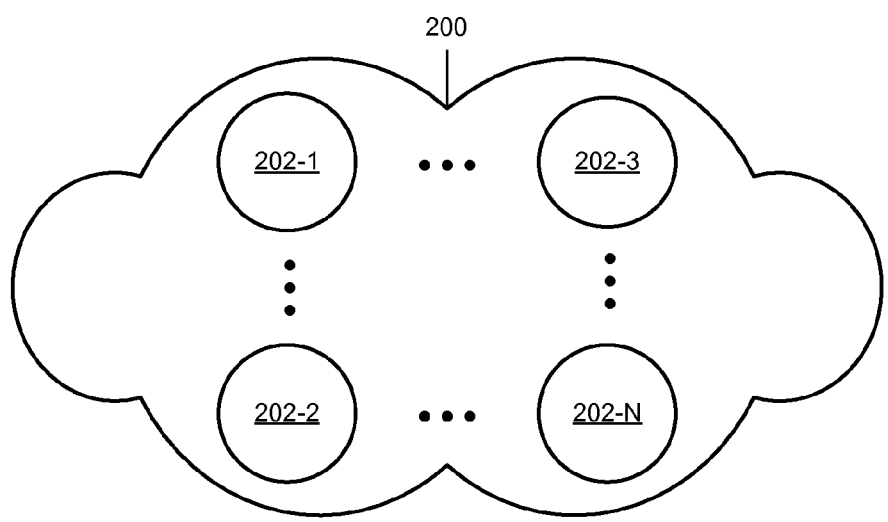
FIG. 2 is a diagram of an exemplary network in which concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 2, network 200 may include devices 202-1 through 202-N (individually referred to herein as a "device 202-x"). Device 202-x may include, for example, device 100, a router, a switch, a gateway, a server, a personal computer, a mobile computer (e.g., a laptop computer, a cell phone, etc.), etc. Although device 202-x may be implemented as any computer-like device, in the following description, device 202-x will be described in terms of a router/switch.

Figure 3:
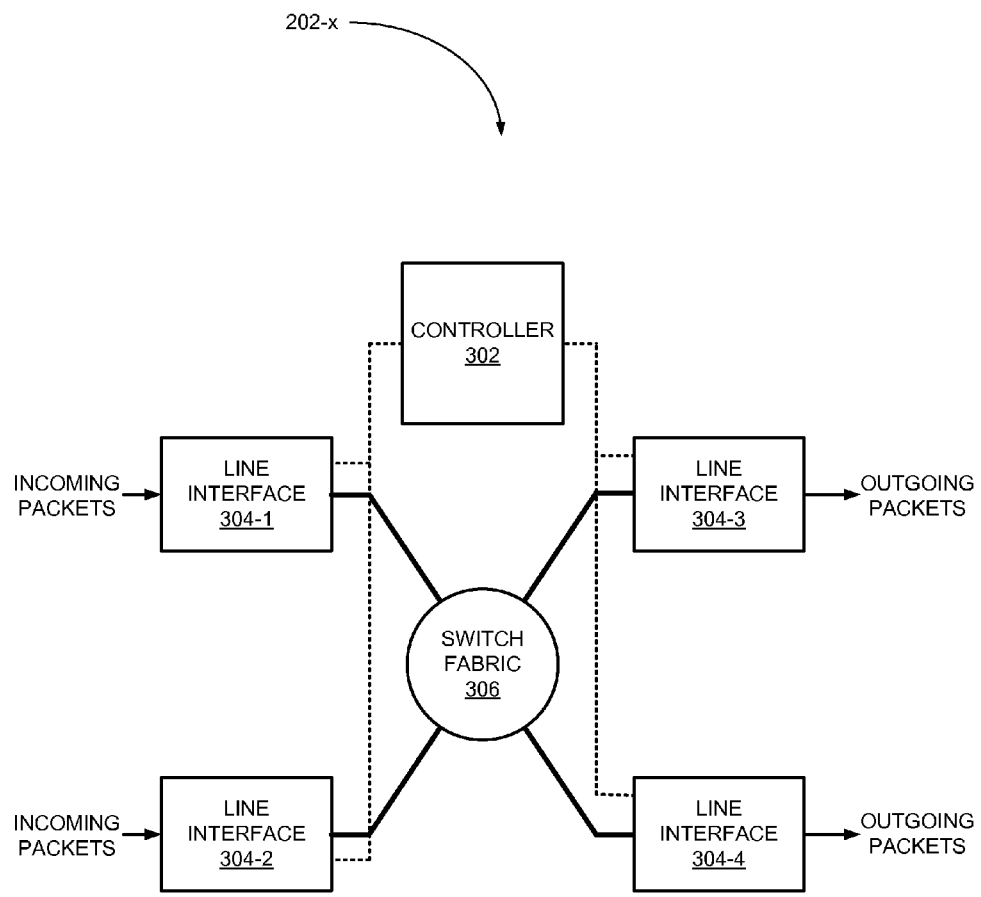
FIG. 3 is a block diagram of an exemplary device of FIG. 2.

FIG. 3 illustrates exemplary components of device 202-x. As shown, device 202-x may include a controller 302, line interfaces 304-1 through 304-4 (collectively referred to herein as "line interfaces 304" and individually as "line interface 304-x"), and a switch fabric 306

Controller 302 may include one or more components for managing routes and/or types of information that may require centralized processing. For example, controller 302 may manage routes (e.g., may accept or disseminate routes to other devices 202) in accordance with routing/signaling protocols, may receive and process statistics related to packets, and/or may process packet samples from other components of device 202-$x$ (e.g., from line interfaces 304). In another example, controller 302 may provide functionalities related to distributing information (e.g., rules for classifying packets) to other components of device 202-$x$.

Line interface 304-$x$ may include one or more components for receiving packets from devices in network 200 and for transmitting the packets to other devices in network 200. In addition, line interface 304-$x$ may forward packets, classify packets, redirect packets to other components in device 202-$x$, manage a table of packet statistics, and/or sample packets.

Switch fabric 306 may include one or more switches for conveying packets from line interfaces 304 and/or other modules of device 202-$x$ (not shown) to line interfaces 304 and/or to the other modules.

Device 202-$x$ may include fewer, additional, and/or different components than shown in FIG. 3. For example, device 202-$x$ may include additional or fewer line interfaces or additional controllers. Device 202-$x$ may further include one or more modules (not shown) that may connect to switch fabric 306 and may perform various network services. For example, device 202-$x$ may include a firewall service module, an intrusion detection service module, an encryption/decryption service module, and/or other types of service modules.

Figure 4:
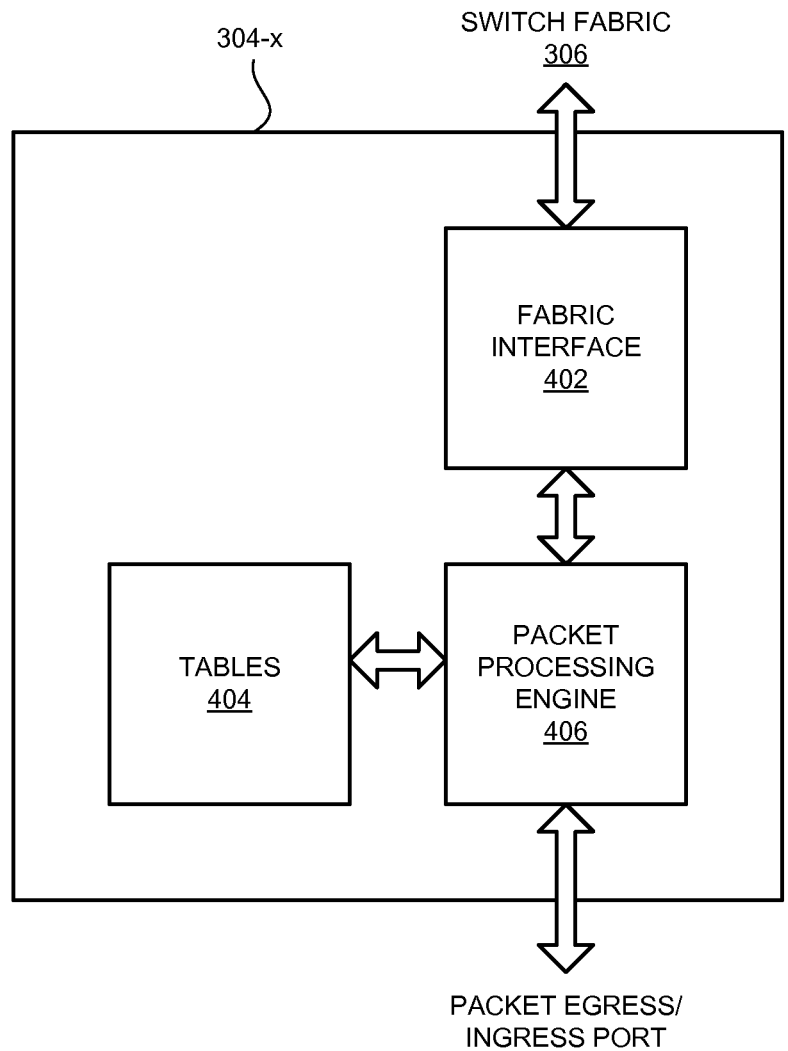
FIG. 4 is a functional block diagram of an exemplary line interface of FIG. 3.

FIG. 4 is a block diagram of exemplary functional components of line interface 304-$x$. As shown, line interface 304-$x$ may include a fabric interface 402, tables 404, and a packet processing engine 406. Although FIG. 4 shows exemplary functional components of line interface 304-$x$, in other implementations, line interface 304-$x$ may include fewer, different, or additional functional components than those depicted in FIG. 4. For example, in one implementation, line interface 304-$x$ may include a communication interface located between packet processing engine 406 and packet egress/ingress port.

Fabric interface 402 may include hardware, software, or a combination of hardware and software that provide an interface to switch fabric 306. For example, fabric interface 402 may include one or more buffers (not shown) for temporarily storing augmented packets (e.g., packets pre-pended with additional header information) received from packet processing engine 406. The buffers may prevent the packets from being dropped if a bottleneck (e.g., a processing delay) develops on a line interface-to-line interface path during packet transport.

Tables 404 may include a classification table, a forwarding table, and/or any other tables that may be used for processing packets. A classification table may include rules for categorizing a packet based on a packet header. Examples of classification rules may include rules for performing an access control list lookup for security purposes, rules for performing policy-based routing (e.g., if a packet header is a telephony packet, the classification rules may route the packet from one location to another location via an asynchronous transfer mode (ATM) circuit), and/or rules for rendering differentiated quality of service (QoS). A forwarding table may include information for identifying an egress line interface to forward an incoming packet to a network node based on the packet's network destination address.

Packet processing engine 406 may include hardware, software, or a combination of hardware and software that forwards and/or classifies a packet received at line interface 304-$x$. Packet processing engine 406 may perform a lookup of tables 404 (e.g., of a forwarding table or of a classification table), may obtain a packet descriptor that includes a forwarding address (e.g., a destination switch fabric port, a destination network port, etc.) and information for processing the packet, may sample the packet, and may manage the sampled packet and/or packet statistics. In addition, packet processing engine 406 may compute a checksum based on a packet header, and determine validity of the checksum.

Figure 5:
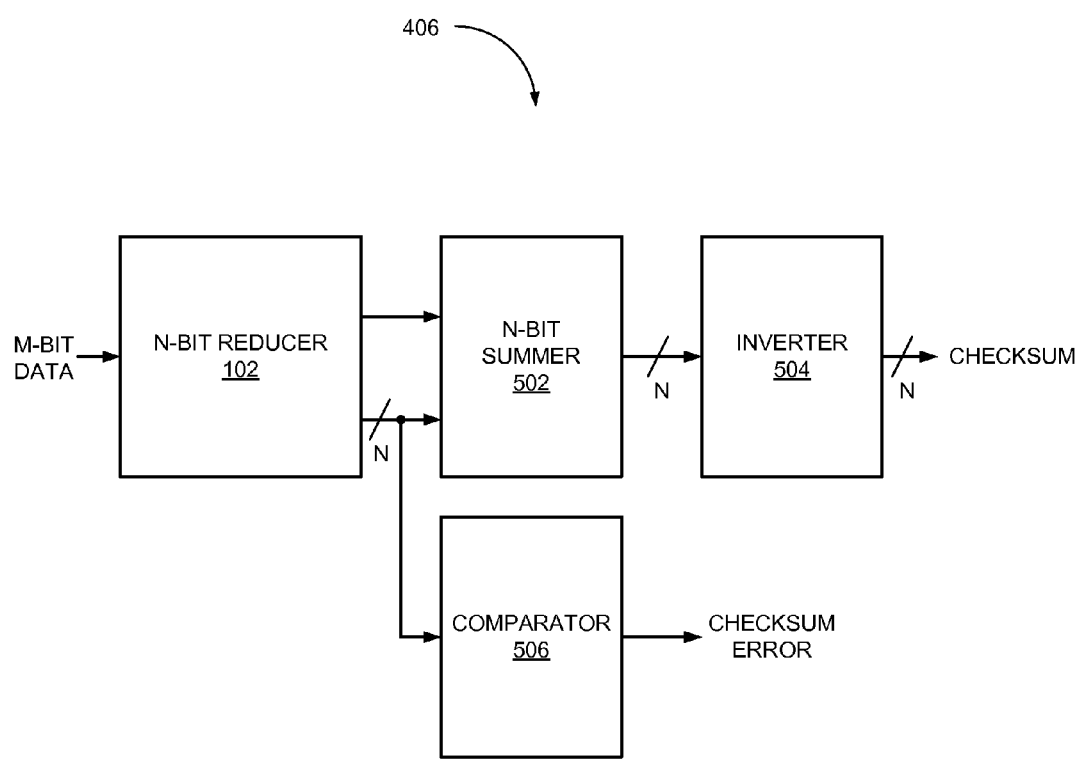
FIG. 5 is a functional block diagram of an exemplary packet processing engine of FIG. 4.

FIG. 5 is a block diagram of exemplary functional components of packet processing engine 406. As shown, packet processing engine 406 may include an N-bit reducer 102, an N-bit summer 502, an inverter 504, and a comparator 506. Although not illustrated in FIG. 5, packet processing engine 406 may include additional components, such as a memory (e.g., a microcode memory, a RAM, etc.), an instruction register, a program counter, general purpose registers (GPRs), etc. to execute microinstructions to perform various functionalities that are associated with packet processing engine 406 (e.g., forwarding a packet).

N-bit reducer 102 may include hardware components for computing N-bit one's complement additions of its inputs (e.g., a portion or all of a packer header), and output sum bits and carry bits that result from the one's complement additions. N-bit summer 502 may add the sum bits and the carry bits. Inverter 504 may generate a complement of the output of N-bit summer 502. The output of inverter 504 may be the checksum of M-bit data that is input at N-bit reducer 102. Thus, if an input to N-but reducer 102 is a packet header, inverter 504 may output the checksum of the packet header.

Comparator 506 may compare the output of N-bit reducer 102 to a constant (e.g., 0xFFFF). If the output of N-bit reducer 102 is not equal to the constant, comparator 506 may output a value that indicates an error (e.g., a bit value of "0.").

Figure 6:
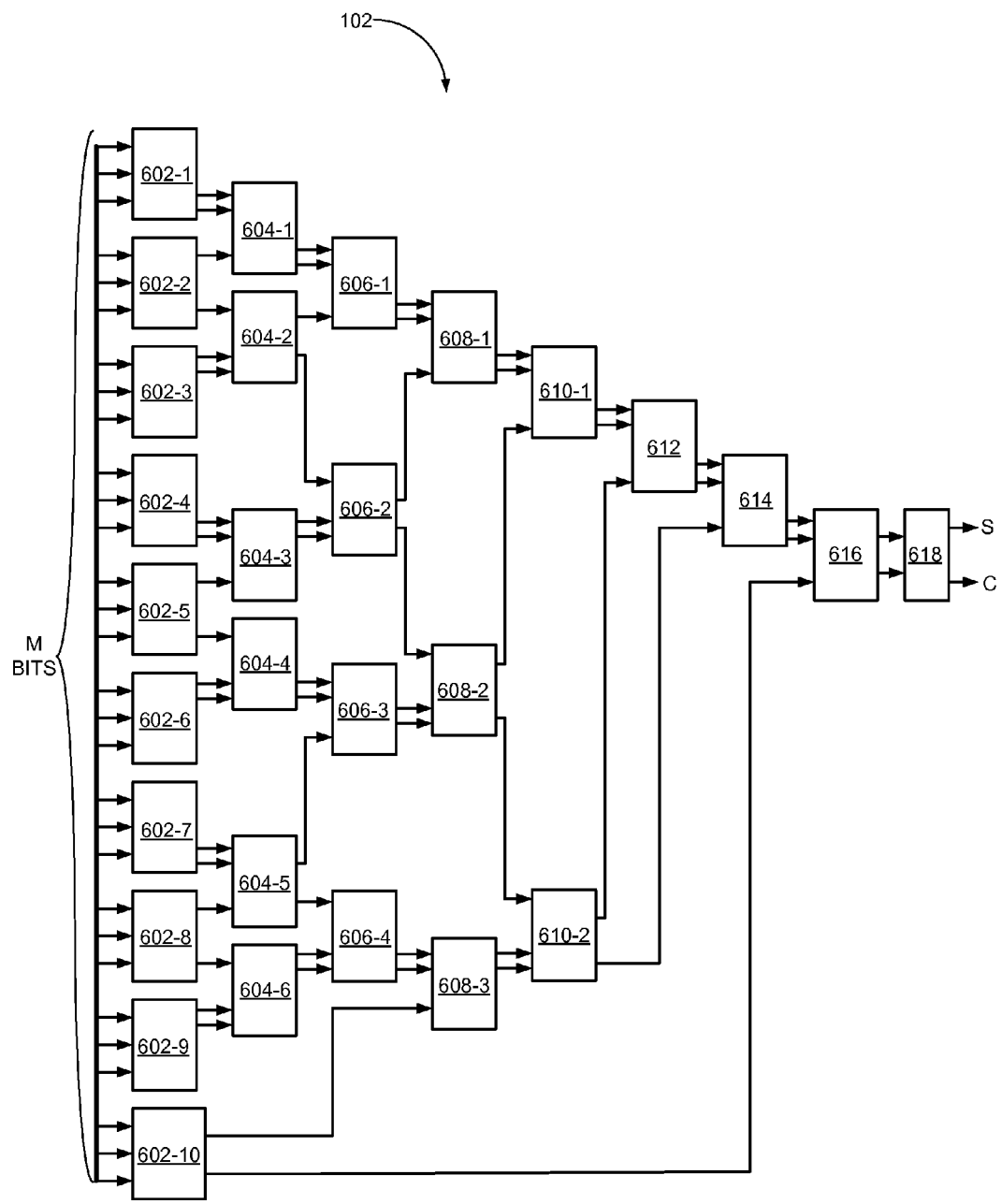
FIG. 6 is a block diagram of an exemplary N-bit reducer of FIG. 5.

FIG. 6 is a block diagram of an exemplary N-bit reducer 102. As shown, N-bit reducer 102 may include 3-to-2 compressors 602-1 through 602-10, 604-1 through 604-6, 606-1 through 606-4, 608-1 through 608-3, 610-1 and 610-2, 612, 614, and 616. Further, N-bit reducer 102 may also include an N-bit adder 618. Depending on the implementation, N-bit reducer 102 may include additional, fewer, or different components than those illustrated in FIG. 6.

Each of 3-to-2 compressors 602-1 through 616 (herein collectively referred to as 3-to-2 compressors 6$xx$ and individually as 3-to-2 compressor 6$xx$) may perform one's complement addition of three N-bit inputs and output a sum of the three inputs. 3-to-2 compressor is described below in greater detail. N-bit adder 618 may include hardware components to receive two N-bit numbers and output a sum S of the two N-bit numbers and a carry bit C.

In FIG. 6, 3-to 2 compressors 6$xx$ may compute, in layers, one's complement addition of, for example, 30 N-bit numbers. For example, at the first layer, M-bit input may be arranged as groups of three inputs, and each group may be directed to each of 3-to-2 compressors 602-1 through 602-10. Each of the first layer 3-to-2 compressors 602-1 through 602-10 may perform one's complement addition of three numbers and output a result for the next layer 3-to-2 compressors 604-1 through 604-6. Similarly, 3-to-2 compressors 6$xx$ of each of other layers may accept M-bit data from the previous layer and output the result to the next layer of 3-to-2 compressors 6$xx$.

In FIG. 6, the layered arrangement of 3-to-2 compressors 6$xx$ may provide the same result as single layer adders in adding 30 N-bit numbers, as one's complement addition is commutative. To illustrate, FIG. 7A depicts a single layer adder, and FIG. 7B depicts two layer adders.

Figure 7A:
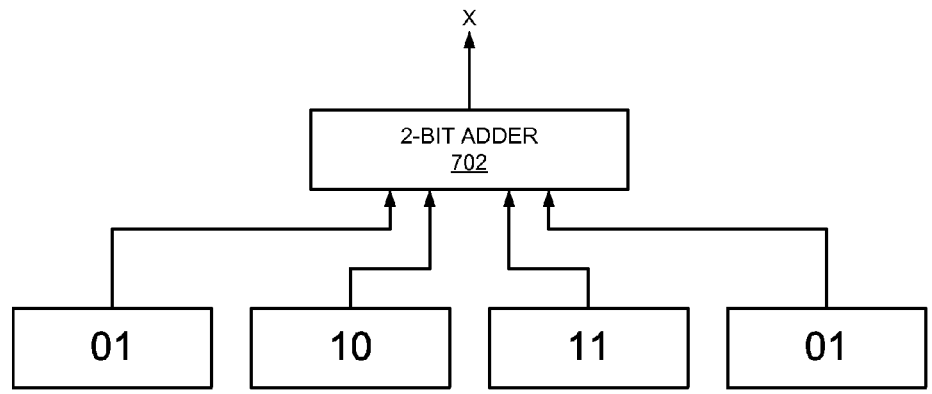
FIG. 7A is a block diagram of an exemplary 2-bit adder.

FIG. 7A is a block diagram of an exemplary 2-bit adder 702 in one layer. As shown, 2-bit adder 702 may add four numbers, 01, 10, 11, and 01, and output X, in accordance with the following expression:

$$X=01+10+11+01. \quad (1)$$

Figure 7B:
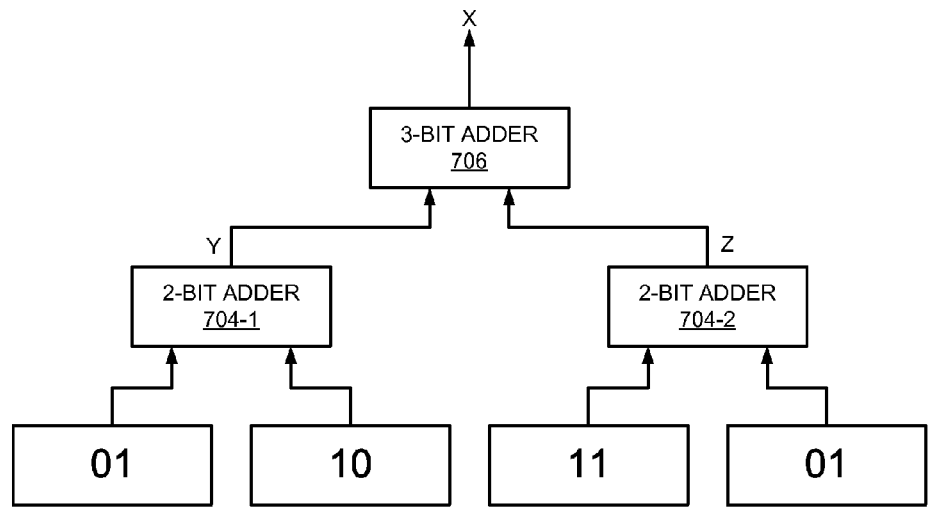
FIG. 7B is a block diagram of an exemplary 3-bit adder and two 2-bit adders.

FIG. 7B is a block diagram of an exemplary 2-bit adder 704-1, 2-bit adder 704-2, and 3-bit adder 706 that are arranged in two layers. As shown, 3-bit adder 706 may add the outputs of 2-bit adders 704-1 and 704-2, Y and Z, in accordance with the following expression:

$$X=Y+Z. \quad (2)$$

To add outputs of 2-bit adders 704-1 and 704-2, 3-bit adder 706 may need to be used, because each 2-bit adder 704-1/704-2 may output a 3 bit number due to an overflow.

2-bit adder 704-1 may add two numbers 01 and 10 in accordance with the following expression:

$$Y=01+10. \quad (3)$$

Furthermore, 2-bit adder 704-2 may add two numbers 11 and 01 in accordance with the following expression:

$$Z=11+01. \quad (4).$$

Substituting for variables Y and Z in expression (2) based on expressions (3) and (4), it is possible to rewrite expression (2) as:

$$X=(01+10)+(11+01). \quad (5)$$

Expression (5) may be as same as expression (1), because one's complement addition is commutative, and the parentheses in expression (5) can be removed. This shows that one's complement addition of 30 N-bit numbers may be performed in layers of 3-to-2 compressors depicted in FIG. 6.

Figure 8A:
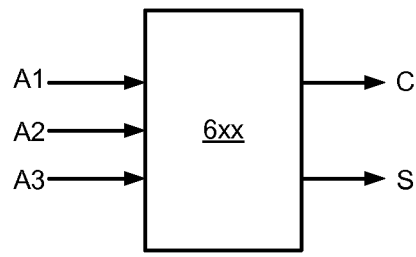
FIG. 8A is a block diagram of an exemplary 3-to-2 compressor of FIG. 6.

FIG. 8A is a block diagram of one implementation of 3-to-2 compressors 6xx of FIG. 6. As shown, 3-to-2 compressor 6xx may include three N-bit inputs for accepting data buses A1, A2, and A3, and two output buses S and C, also known as sum bits and carry bits, respectively, for outputting the sum of A1, A2, and A3.

Figure 8B:
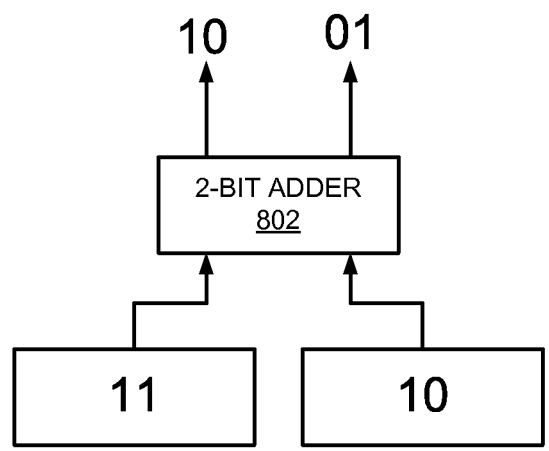
FIG. 8B is a block diagram of another exemplary 2-bit adder with carry bits and sum bits.

In an adder, such as 3-to-2 compressor 6xx, the sum bits and the carry bits may represent the sum of its operands. More particularly, a sum bit may be equal to an EXCLUSIVE-OR (XOR) of the operand bits (e.g. S=A1^A2^A3, where ^ refers to XOR operation), and a carry bit may be equal to OR'ed combinations of AND of the operand bits (e.g., C=A1 & A2+A2 & A3+A1 & A3, where & refers to AND operation and + refers to OR operation). For example, FIG. 8B illustrates an exemplary 2-bit adder with sum bits and carry bits. As shown, operands 11 and 10 may be input to 2-bit adder 802. Performing a bitwise XOR of 11 and 10 may yield sum bits of 01, and performing a bitwise AND of 11 and 10 may yield carry bits of 10. Sum bits of 01 and carry bits of 10 may represent the sum of 11 and 10. If needed or desired, a single numerical representation of the sum (e.g., 101) may be obtained by multiplying the carry bits by two (e.g., shifting the carry bits to its left by 1) and adding the result of the multiplication to the sum bits.

Returning to FIG. 6, in the layered arrangement as illustrated, the number of bits in each input of each 3-to-2 compressor 6xx may be set at N. For example, assume that the number of bits in one of three inputs shown for 3-to-2 compressor 602-1 is 16. The number of input bits in other 3-to-2 compressors (e.g., compressor 616) may also be set at 16. In such an implementation, uniformity in the number of bits for different compressors 6xx may facilitate the design and manufacture of N-bit reducer 102.

In some implementations, when an addition is performed in multiple layers, a number of bits for each input of devices in one layer may be greater than a number of bits for each input of devices in the preceding layer. For example, in FIG. 7B, the number of bits for each input to 2-bit adder 704-1/704-2 may be two. However, the number of bits for each input to 3-bit adder 706 may be three, to accommodate a possible overflow bit at the output of 2-bit adder 704-1/704-2. In such implementations, with each additional layer, the width of input buses for adders of the additional layer may be greater than the width of input buses of the preceding layer.

To avoid increasing the number of input buses in each additional layer, 3-to-2 compressors 6xx may be interconnected or configured based on properties that are associated with one's complement addition. To illustrate, FIGS. 9A through 9C show an exemplary one's complement addition.

FIG. 9A shows sum bits 902 and carry bits 904 that may result from adding 10001 to 10111. As shown, sum bits 902 may be obtained by bitwise XOR of 10001 and 1011, and carry bits may be obtained by bitwise AND of 10001 and 10111. In FIG. 9A, carry bits 904 are shown above the operand 10001, shifted one bit to the left of 10001, to indicate the numerical magnitude of carry bits 904 in relation to the operand 10001.

FIG. 9B shows adding carry bits 904 and sum bits 902 to obtain a single one's complement representation of the sum of 10001 and 10111. As shown, carry bits 904 (10001) may be shifted by one and added to sum bits 902 (00110), yielding 101000. In one's complement addition, however, if there is an overflow bit that results from the sum, the overflow bit may be removed from the sum and added to the lowest digit of the sum. As further shown in FIG. 9B, overflow bit 906 may be removed from 101000 and added to 01000, to yield 01001.

FIG. 9C shows a different way of adding carry bits 904 and sum bits 902 to obtain a single one's complement representation of the sum of 10001 and 10111 (sum bits) than that illustrated in FIG. 9B. As shown in FIG. 9C, overflow bit 906 in carry bits 904 may be removed from carry bits 904 and added to the lowest bit of the remaining bits to yield modified carry bits 908, which may then be to sum bits 902.

Figure 10A:
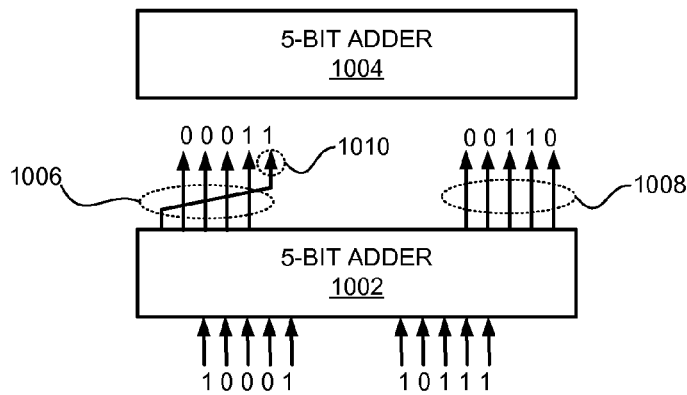
FIG. 10A is a block diagram illustrating exemplary 5-bit adders that implements one's complement addition.

FIG. 10A illustrates a block diagram of 5-bit adders 1002 and 1004 that correspond to the addition illustrated in FIGS. 9A and 9C. As shown in FIG. 10A, 5-bit adder 1002 may accept inputs 10001 and 10111 and output carry bits and sum bits on carry buses 1006 and sum buses 1008, respectively. 5-bit adder 1002 may correspond to the operation illustrated in FIG. 9A. As further shown, 5-bit adder 1004 may accept carry bits 904 and sum bits 902, and add them to produce its own sum bits and carry bits (not shown). 5-bit adder 1004 may correspond to the addition of modified carry bits 908 to sum bits 902 in FIG. 9C.

In FIG. 10A, the most significant bit bus of carry buses 1006 is shown as being extended around other carry buses and positioned as the least significant bit bus 1010. The rotation of the most significant bit bus as the least significant bit bus 1010 may correspond to removing the most significant bit of carry bits 904 in FIG. 9C and adding it to the least significant bit.

In FIG. 10A, the width of input buses to 5-bit adder 1004 may remain at 5, because the number of carry bits buses from 5-bit adder 1002 is maintained at 5, via repositioning of the most significant bit bus as the least significant bit bus of carry bit buses 1008. Without the repositioning of the most significant bit bus, the number of carry buses feeding into an adder of the next layer may need to be increased by one to correctly represent the magnitude of the carry bits, and a 6-bit adder may need to be used in place of 5-bit adder 1004.

Figure 10B:
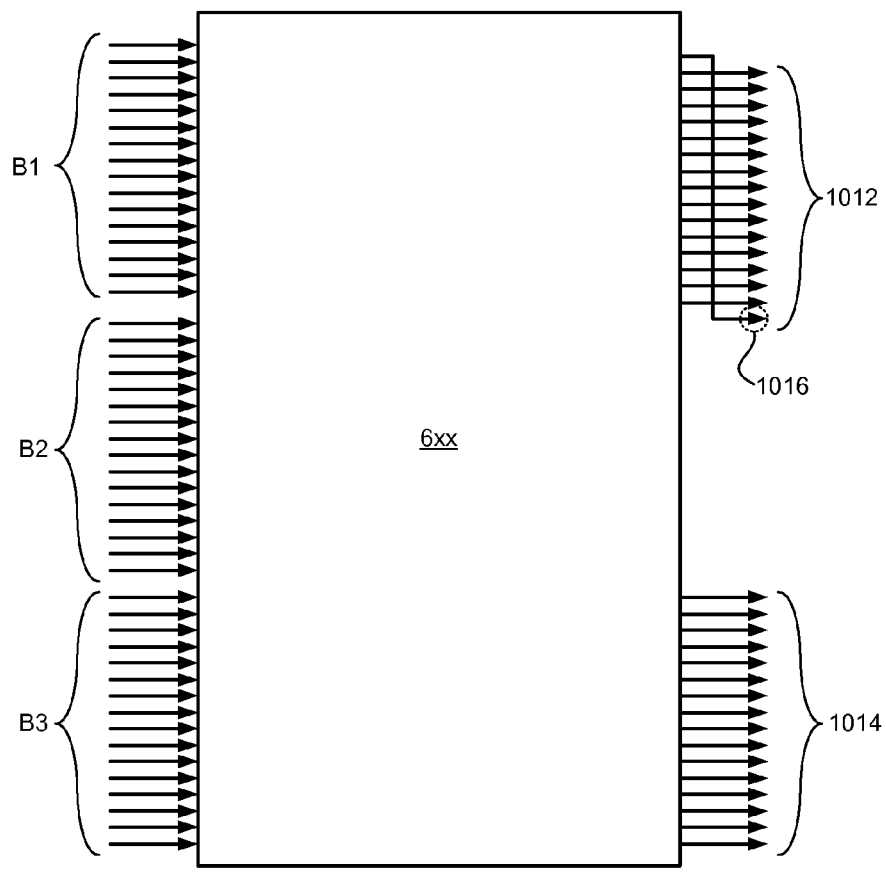
FIG. 10B is an expanded view of the 3-to-2 compressor of FIG. 8A.

FIG. 10B illustrates an expanded view of 3-to-2 compressor 6xx whose most significant bit bus of its carry buses is repositioned as the least significant bit bus. As shown, 3-to-2 compressor 6xx may accept N (e.g., 16) bit inputs buses B1, B2, and B3, and may output carry buses 1010 and sum buses 1012. As further shown, the most significant bit bus of carry buses 1010 may extend about other carry bit buses and be set as the least significant bit bus. The repositioning of the most significant bit bus as the least significant bit bus of carry buses 1010 in a 3-to-2 compressor 6xx in one layer may allow the 3-to-2 compressor 6xx to provide input buses that are as wide as buses B1, B2, or B3 to a 3-to-2 compressor 6xx in the next layer.

Figure 11:
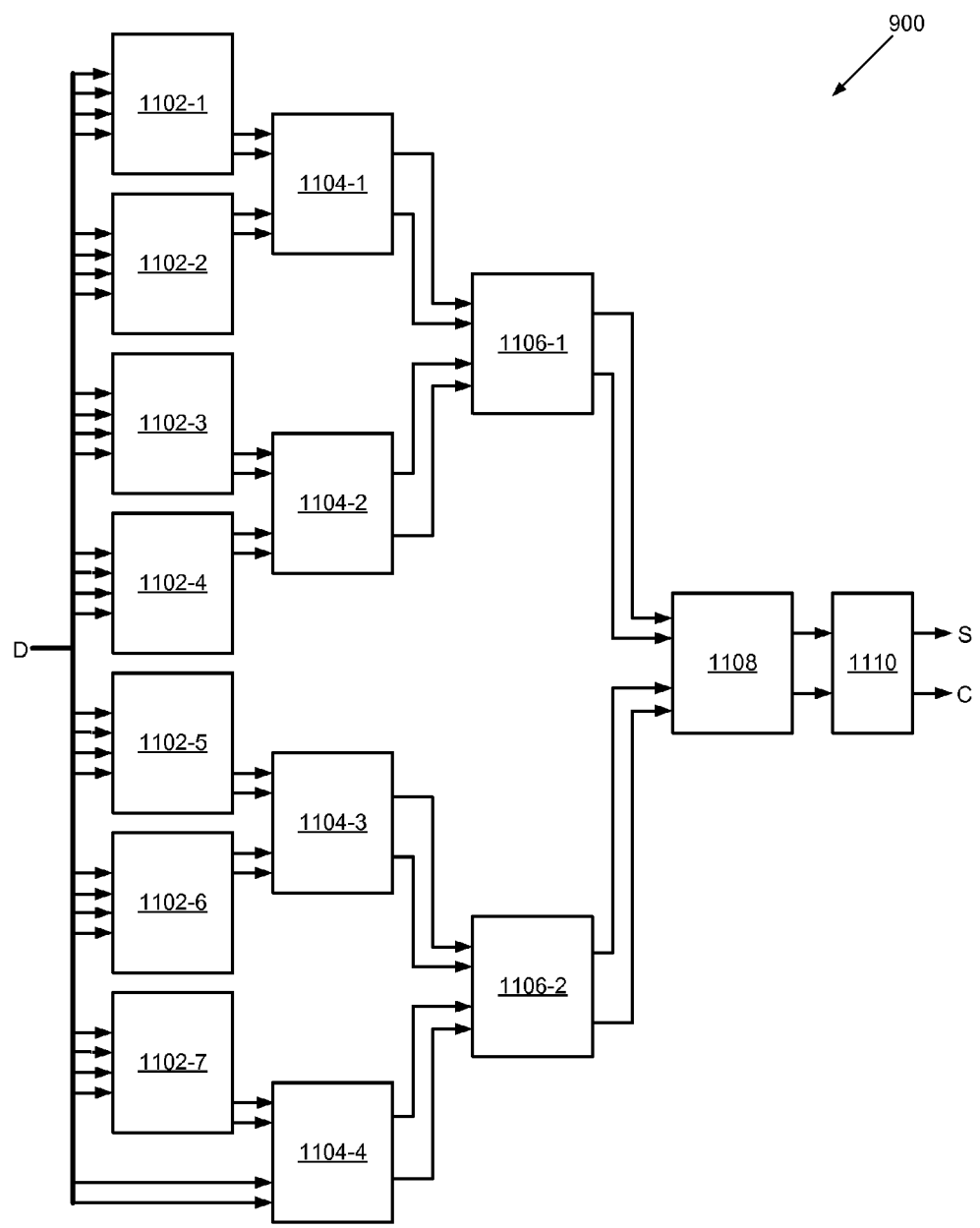
FIG. 11 is a block diagram of another exemplary N-bit reducer of FIG. 5.

FIG. 11 is a block diagram of another implementation of N-bit reducer 102. As shown, N-bit reducer 102 may include 4-to-2 compressors 1102-1 through 1102-7, 1104-1 through 1104-4, 1106-1 and 1106-2, and 1108 (herein collectively referred to as 4-to-2 compressors 11xx and individually as 4-to-2 compressor 11xx), and an N-bit adder 1110. Further, N-bit reducer 102 may include an N-bit adder 1110. Depending on the implementation, N-bit reducer 102 may include additional, fewer, or different components than those illustrated in FIG. 11.

Each 4-to-2 compressor 11xx may accept four inputs, compute carry bits and sum bits of the sum of four inputs, and output the carry bits and sum bits. Because each 4-to-2 compressor 11xx may accept more inputs than 3-to-2 compressor 6xx, fewer 4-to-2 compressors 11xx may be used to produce one's complement sum of, for example, 30 N-bit inputs than 3-to-2 compressors 6xx.

N-bit adder 1110 may include components that are similar to those of N-bit adder 618, and may operate similarly.

Exemplary Processes for Generating One's Complement

Figure 12:
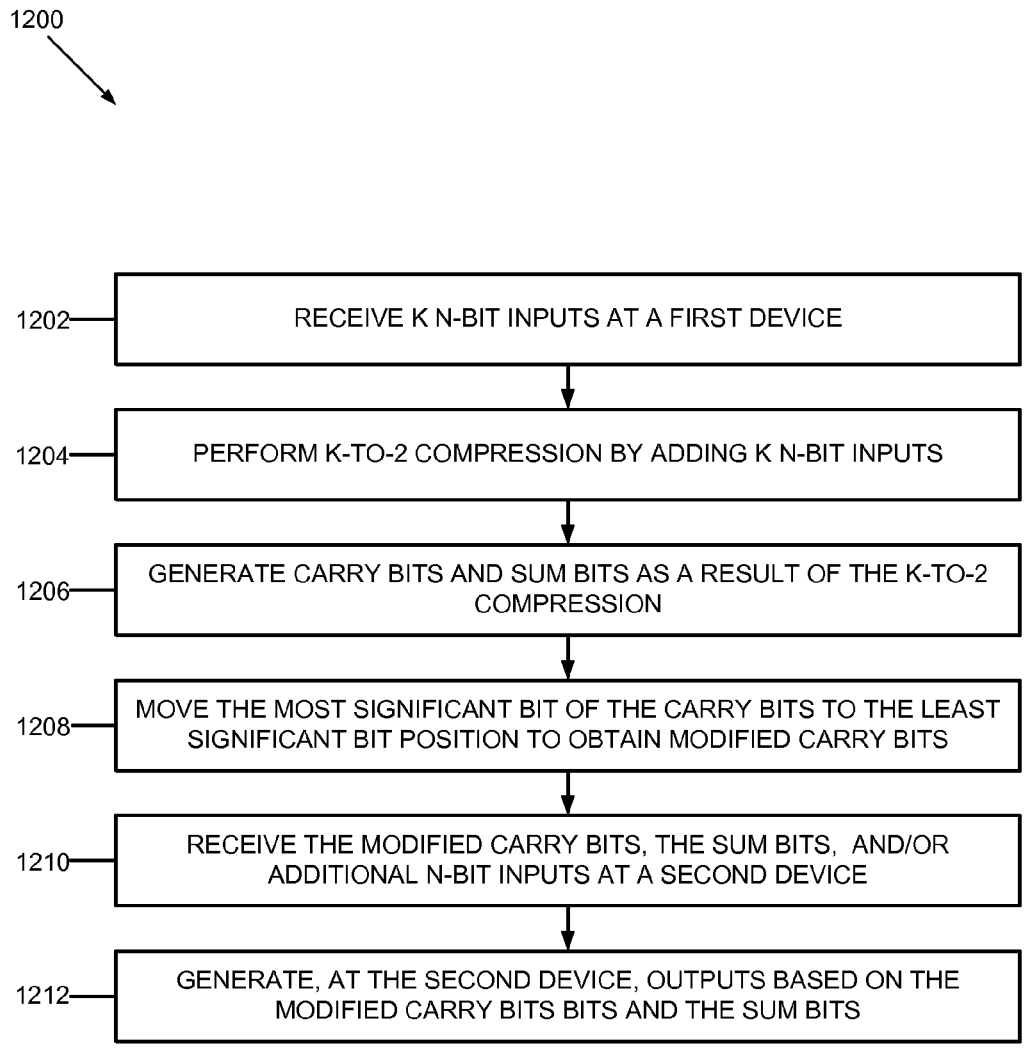
FIG. 12 is a flow diagram of an exemplary process for generating one's complement.

FIG. 12 is a flow diagram of an exemplary process 1200 for generating one's complement sum of N-bit inputs. Assume that "K," as used in the following, may represent an integer greater than one.

Process 1200 may start at 1202, where K N-bit inputs may be received at a device (block 1202). For example, 3-to-2 compressor 6xx may receive three 16-bit inputs.

K-to-2 compression may be performed by adding K N-bit inputs (block 1204). For example, 3-to-2 compressor 6xx may perform 3-to-2 compression by adding three 16-bit inputs.

Carry bits and sum bits may be generated as a result of the K-to-2 compression (block 1206). For example, 3-to-2 compressor 6xx may add three 16-bit inputs and output carry bits and sum bits that represent the sum of the three 16-bit inputs.

The most significant bit of the carry bits may be moved to the least significant bit position to produce modified carry bits (block 1208). For example, as described above with reference to FIG. 10B, the most significant bit bus of carry buses 1010 may be repositioned as the least significant bit bus of carry buses 1010. Consequently, the most significant bit of the carry bits that are associated with carry buses 1010 may be repositioned as the least significant bit.

The modified carry bits and the sum bits from the first device and additional N-bit inputs may be received at a second device (block 1210). For example, in FIG. 6, 3-to-2 compressor 604-1 may receive modified carry bits and sum bits from 3-to-2 compressor 602-1. In addition, 3-to-2 compressor 604-1 may receive an input from 3-to-2 compressor 604-2. In another example, in FIG. 11, N-bit adder 1110 may receive modified carry bits and sum bits from 4-to-2 compressor 1108.

Outputs may be generated at the second device based on the modified carry bits and the sum bits (block 1212). For example, in FIG. 6, 3-to-2 compressor 604-2 may produce carry bits and sum bits based on input carry bits and input sum bits from 3-to-2 compressor 602-2 and 3-to-2 compressor 602-3. In another example, in FIG. 6, N-bit adder 618 may output sum bits S and a single carry bit C (e.g., an overflow bit) based on input sum bits and input carry bits from 3-to-2 compressor 618.

In the above, N-bit reducer 102 may accept data from buses of a given width M (e.g., 480 bits), compute a one's complement having width N, and output the one's complement. N-bit reducer 102 may perform the computation at high speeds, as K-to-2 compressors (e.g., 3-to-2 compressors 6xx, 4-to-2 compressors 11xx, etc.) included in N-bit reducer 102 may perform parts of the computation in parallel. In addition, N-bit reducer 102 may be implemented using layers of K-to-2 compressors that have the same input/output bus width, thus simplifying design and manufacture of integrated circuits that form N-bit reducer 102.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while FIG. 6 shows 30 N-bit inputs to N-bit reducer 102, in a different implementation, N-bit reducer 102 may accept a different number of N-bit inputs. To illustrate, assume that N-bit reducer 102 accepts 15 16-bit inputs, and input data is 30×16 bits wide (i.e., 480 bits wide). In such an implementation, to compute one's complement of the input data, device 100 may split 30 inputs into two groups of 15 inputs, a obtain one's complement sum for each group in sequence, and combine the resulting one's complement sums of the groups.

In another example, while a series of blocks has been described with regard to exemplary processes illustrated in FIG. 12, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A system comprising:
one or more hardware components, associated with a first compressor in a first layer, to:
receive, via a first bus associated with the first compressor, a first input from a second compressor,
the second compressor being in a second layer, and
the second layer being different from the first layer,
receive, via a second bus associated with the first compressor, a second input from the second compressor,
receive, via a third bus associated with the first compressor, a third input from a third compressor,
the third compressor being in a third layer,
the third layer being different from the first layer and the second layer,
the second compressor receiving one or more inputs from a fourth compressor,
the fourth compressor being in a fourth layer,
the fourth layer being different from the first layer, the second layer, and the third layer, and
the first input, the second input, and the third input having a predetermined width,
compute a one's complement sum of the first input, the second input, and the third input to generate carry bits having the predetermined width and sum bits having the predetermined width,
move a most significant bit of the carry bits to a least significant bit position to obtain modified carry bits,
output the sum bits via a fourth bus associated with the first compressor, and
output the modified carry bits via a fifth bus associated with the first compressor.

2. The system of claim 1, where the system comprises:
a router,
a switch,
a personal computer,
a laptop, or
a gateway.

3. The system of claim 1, where the first compressor, the second compressor, and the third compressor are 3-to-2 compressors.

4. The system of claim 1, where, when computing the one's complement sum, the compressor is to:
perform a bitwise logical EXCLUSIVE-OR of the first input, the second input, and the third input to compute the one's complement sum.

5. The system of claim 1, further comprising:
a first adder to:
add the carry bits and the sum bits, and
output other sum bits and a carry bit based on the adding of the carry bits and the sum bits.

6. The system of claim 5, further comprising:
a second adder to:
receive the other sum bits and the carry bit, and
output a result of adding the sum bits to the carry bit; and
an inverter to:
receive the result,
invert bits of the result to generate a checksum, and
output the checksum.

7. The system of claim 1, further comprising:
a particular bus to carry data to the third compressor and to a plurality of other compressors in the third layer in accordance with a processor instruction.

8. The system of claim 7, where the data includes:
a portion of a packet header.

9. The system of claim 7, where the particular bus is a 480-bits wide bus.

10. The system of claim 7, where the third compressor includes:
three or more 16-bit input buses for receiving a portion of the data as inputs.

11. The system of claim 1, where the modified carry bits have the predetermined width.

12. The system of claim 1,
where the first input includes sum bits that are generated by the second compressor,
where the second input includes carry bits that are generated by the second compressor, and
where the third input includes carry bits that are generated by the third compressor.

13. A method comprising:
receiving, by a first hardware-based compressor and via a first bus associated with the first compressor, a first input,
the first compressor being in a first layer,
the first input being received by the first compressor from a second compressor that is in a second layer, and
the second layer being different from the first layer;
receiving, by the first compressor and via a second bus associated with the first compressor, a second input from the second compressor;
receiving, the first compressor and via a third bus associated with the first compressor, a third input from a third compressor,
the third compressor being in a third layer,
the third layer being different from the first layer and the second layer,
the second compressor receiving one or more inputs from a fourth compressor,
the fourth compressor being in a fourth layer, and
the fourth layer being different from the first layer, the second layer, and the third layer, and
the first input, the second input, and the third input having a predetermined width;
computing, by the first compressor, a one's complement sum of the first input, the second input, and the third input to generate carry bits of the predetermined width and sum bits of the predetermined width;
modifying, by the first compressor, the carry bits by repositioning a most significant bit, of the carry bits, as a least significant bit of the carry bits to obtain modified carry bits;
outputting, by the first compressor, the modified carry bits via a fourth bus associated with the first compressor; and
outputting, by the first device, the sum bits via a fifth bus associated with associated with the first compressor.

14. The method of claim 13, where computing the one's complement sum of the first input, the second input, and the third input includes performing a logical AND of the first input, the second input, and the third input.

15. The method of claim 13, where computing the one's complement sum includes:
adding the first input, the second input, and the third input to compute the one's complement sum.

16. The method of claim 13, further comprising:
receiving, by a second device, the modified carry bits and the sum bits,
the second device being different from the first compressor;

adding, by the second device, the modified carry bits and the sum bits to produce other sum bits and a carry bit; and outputting, by the second device, the other sum bits and the carry bit.

17. The method of claim 16, further comprising:

determining a result of adding the other sum bits to the carry bit;

inverting the result to generate a checksum; and outputting the checksum.

18. The method of claim 13, where the third compressor generates the third input based on three inputs that are portions of a packet header.

19. A non-transitory computer-readable memory device comprising:

one or more instructions that, when executed by at least one device, cause the at least one device to:

receive, via a first bus associated with a first compressor in a first layer, a first input from a second compressor, the second compressor being in a second layer, and the second layer being different from the first layer;

receive, via a second bus associated with the first compressor, a second input from the second compressor;

receive, via a third bus associated with the first compressor, a third input from a third compressor, the third compressor being in a third layer, the third layer being different from the first layer and the second layer, the second compressor receiving one or more inputs from a fourth compressor, the fourth compressor being in a fourth layer, and the fourth layer being different from the first layer, the second layer, and the third layer;

determine a one's complement sum of the first input, the second input, and the third input to generate carry bits on carry buses, of the first compressor, and sum bits on sum buses;

move a most significant bit of the carry bits into a least significant bit of the carry bits to obtain modified carry bits; and send the modified carry bits on the carry buses and the sum bits on the sum buses.

20. The non-transitory computer-readable memory device of claim 19, where the third compressor computes the third input in parallel with other compressors in the third layer computing other outputs that are used to generate the first input and the second input.

* * * * *